Figure 1:
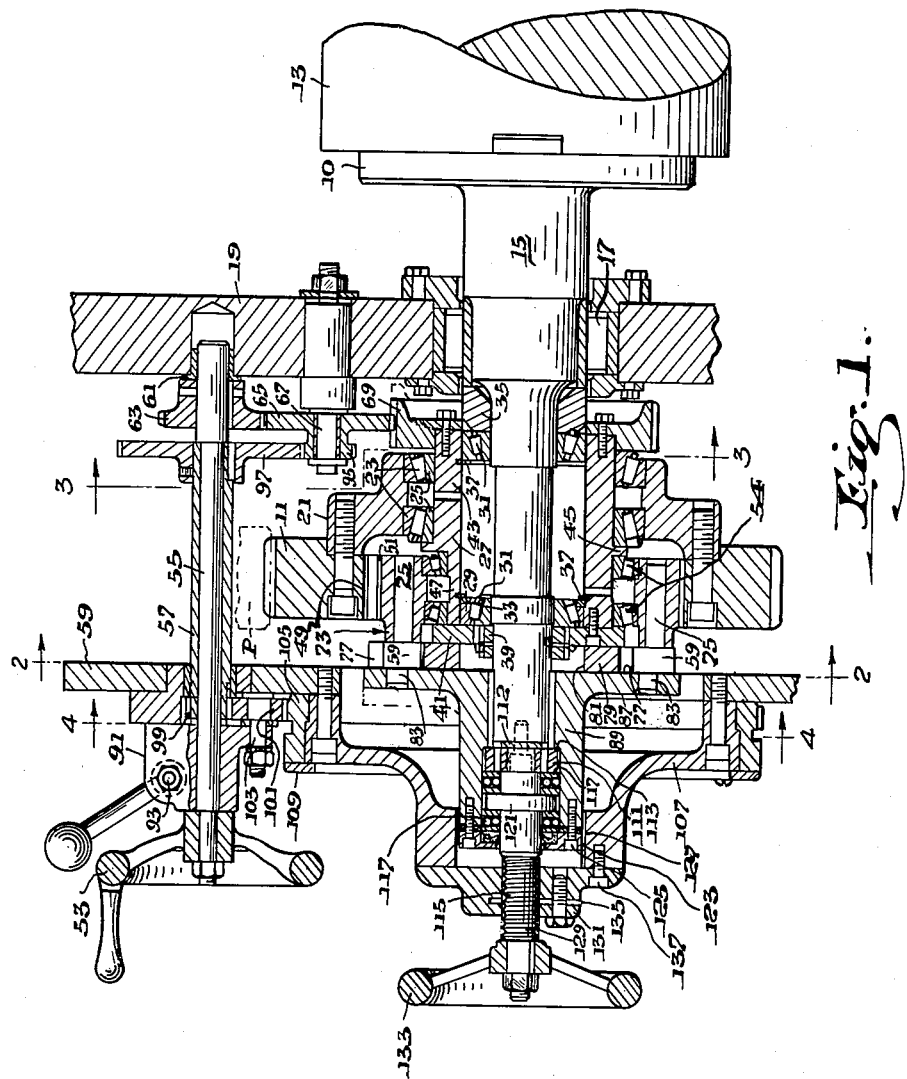

June 6, 1961  H. D. WARD, JR  2,986,952
SHAFT ADJUSTING MEANS

Filed Sept. 4, 1959  4 Sheets-Sheet 2

INVENTOR.
HENRY D. WARD, JR.
BY
Fred P. Kostka
his ATTORNEY.

June 6, 1961 H. D. WARD, JR 2,986,952
SHAFT ADJUSTING MEANS
Filed Sept. 4, 1959 4 Sheets-Sheet 3

INVENTOR.
HENRY D. WARD, JR.
BY Fred P. Kostka
his ATTORNEY

June 6, 1961 H. D. WARD, JR 2,986,952
SHAFT ADJUSTING MEANS
Filed Sept. 4, 1959 4 Sheets-Sheet 4

INVENTOR.
HENRY D. WARD, JR.
BY
Fred P. Kostka
his ATTORNEY

United States Patent Office 2,986,952
Patented June 6, 1961

2,986,952
SHAFT ADJUSTING MEANS
Henry D. Ward, Jr., Timonium, Md., assignor to Koppers Company, Inc., a corporation of Delaware
Filed Sept. 4, 1959, Ser. No. 838,330
4 Claims. (Cl. 74—395)

This invention relates to machines which employ a plurality of shafts driven in unison by way of a gear train and more particularly to a machine for singly or sequentially performing slitting, printing, cutting, or scoring upon web-like sheet material being fed through the machine.

In the operation of these machines, it often times becomes necessary to adjust one or more of the shafts angularly with respect to its driving gear in order that the operating member on the shaft which performs one of the above operations or otherwise operates on the material passing through the machine may be brought into proper registry with the material. Heretofore, various types of registry adjustment means have been employed. These devices have either been limited to a few degrees of adjustment or when 360 degrees turning registry is accomplished, the devices have been so complex as to limit their feasibility for commercial use.

The present invention relates to a mechanism for effecting such angular adjustment of the shaft with respect to its driving gear, while the machine is running or while the machine is stopped, employing a simple means which is economical to manufacture and is readily constructed. As a further advantage, the device is so constructed that the magnitude of the adjustment may be read directly on a calibrated dial which is mounted on the exterior of the machine and is stationary when the machine is running.

In carrying out the invention, there is employed a driving gear and an internal gear which is rotatable with said driving gear. A spur gear is eccentrically mounted within said internal gear for meshing with a major portion of the teeth of said internal gear. The angular eccentricity of the spur gear may be varied such that the desired angular relationship of the spur gear and the driving gear is achieved. The spur gear is connected to the driven shaft so that upon varying the eccentricity of the spur gear, the driven shaft is turned angularly relative to said driving gear. Because the spur gear is movable 360 degrees within the internal gear, it is possible to achieve a 360 degree adjustment of the driven shaft.

As a further feature, there is operatively associated with the shaft a gear train for indicating the amount of angular turning of the driven shaft.

Figure 2:
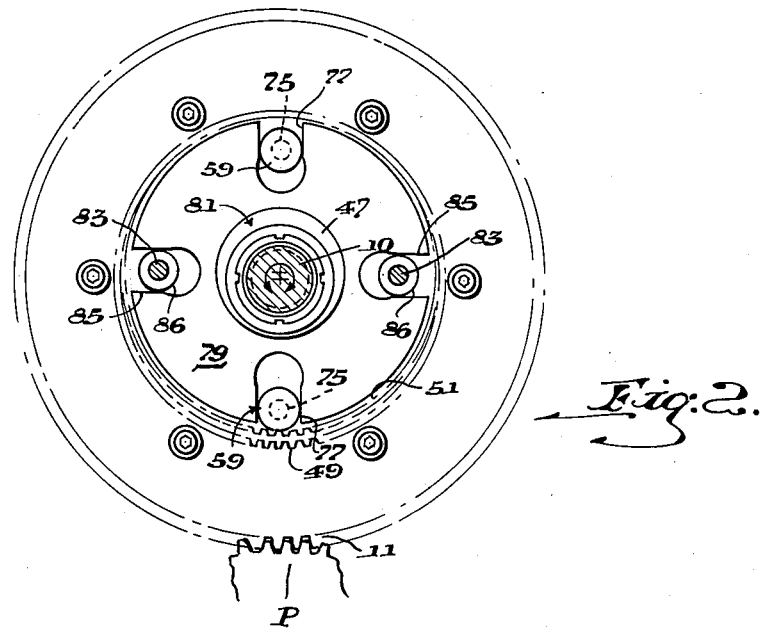
Figure 3:
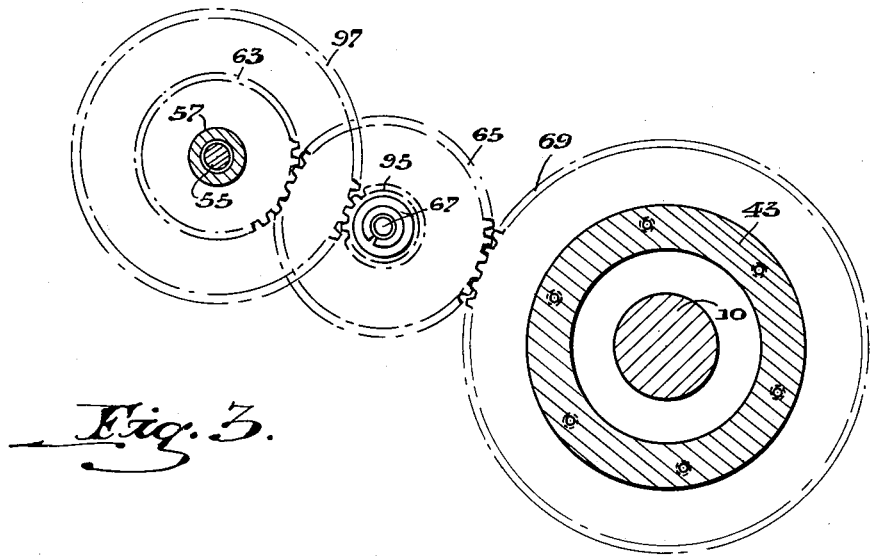
Figure 4:
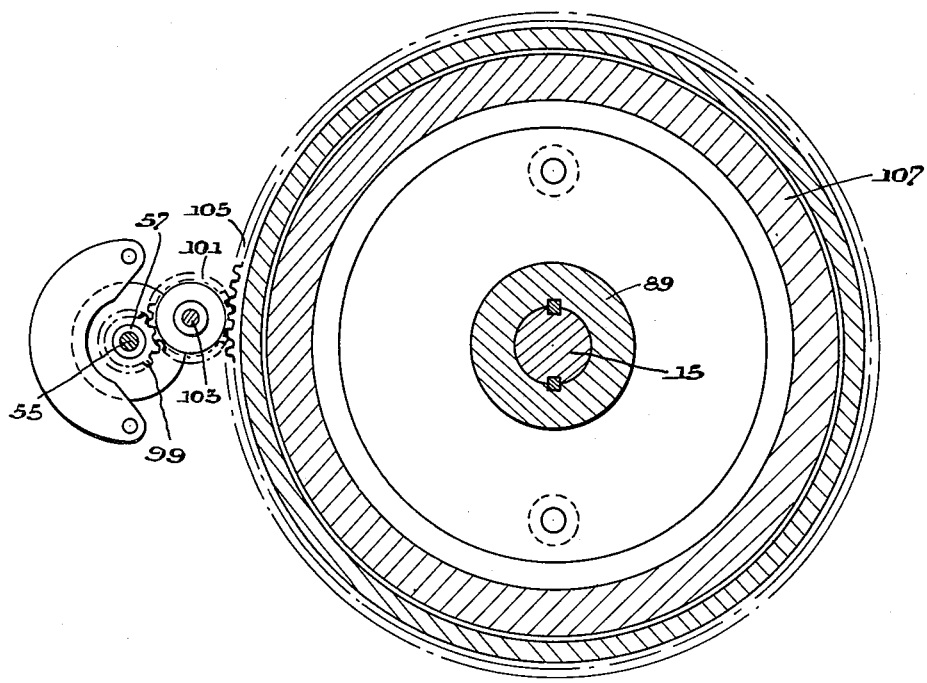
Figure 5:
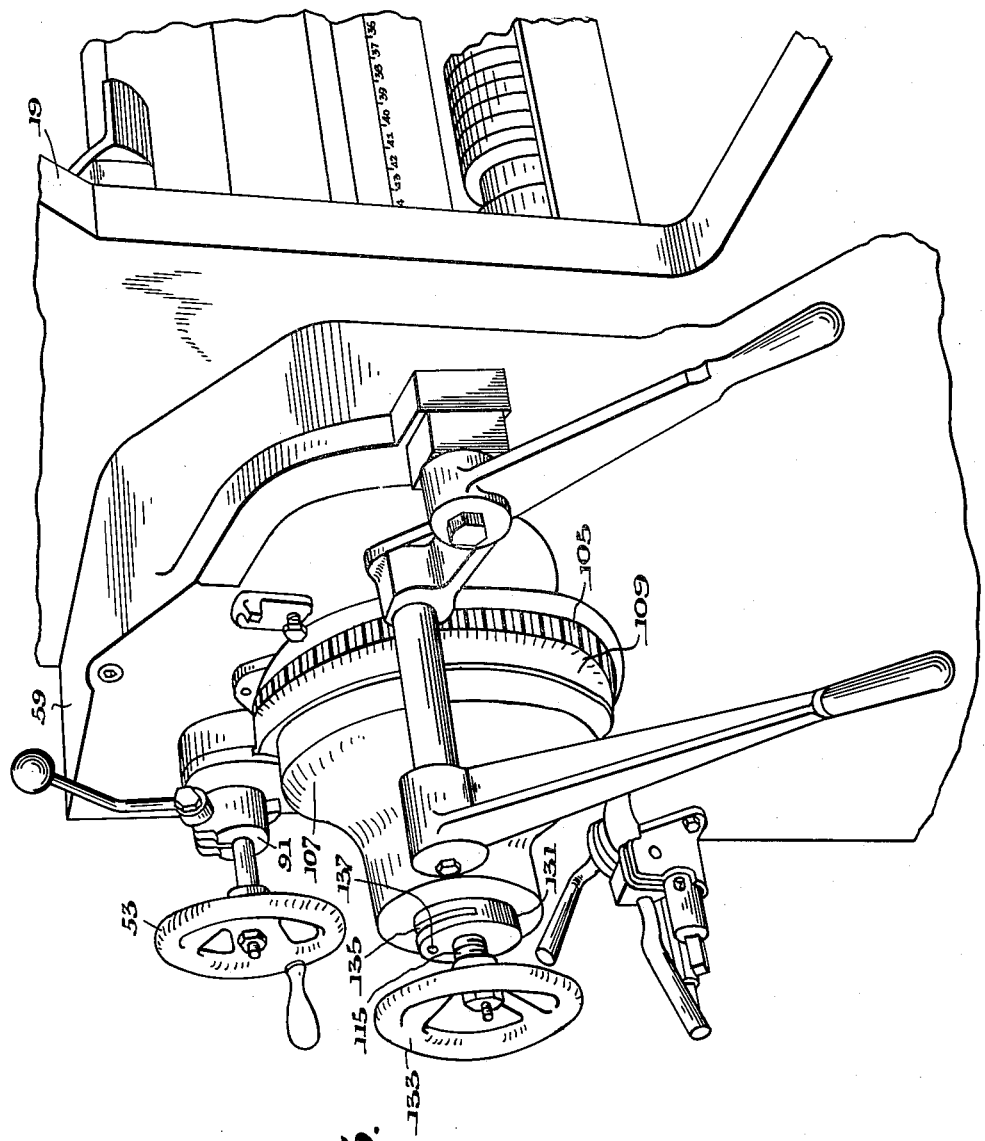

In the drawings:
FIG. 1 is a cross-sectional view through the shaft registry device.
FIGS. 2, 3, and 4 are views taken along the lines 2—2, 3—3, and 4—4 respectively of FIG. 1.
FIG. 5 is a perspective view of a machine embodying the registry device.

Referring to the drawings, 10 represents a shaft in a power operated machine which requires angular adjustment relative to driving gear 11 which is driven by way of a gear P forming the gear train for driving the various operating shafts of the machine. Fixedly mounted on the shaft 10 may be a printing cylinder 13 which may require angular adjustment with respect to the gear 11 for the purpose of achieving the desired registry of the printed matter with the paper sheets or blanks passing through the machine.

The reduced end 15 of the shaft 10 is suitably journaled at each end in bearings 17 mounted in the frame 19 of the machine and carries at one end extending outside of the frame 19 the roller driving means which incorporates, in accordance with the present invention, the arrangement for selectively angularly adjusting the shaft with respect to the drive means.

As shown, the driving means is in the form of an external gear 11 which is fixed as by bolts to a hub 21 which is rotatably journaled on roller bearings 23 of which the inner races 25 are force fitted onto a sleeve 27.

The sleeve 27 is rotatably mounted on the outer races 29 of spaced bearings 31 of which the inner races 33 are force fitted on a reduced end portion 15 of the shaft 10. The bearings 31 are fixed against axial movement by the collar 35 and snap ring 37 at one end and the lock nut 39 and snap ring 37 at the other end. One end 43 of the sleeve 27, upon which the bearings 23 journaling the gear supporting hub are supported, is formed concentric with the shaft 10 while the opposite end extending beyond a projecting lip 45 is formed with an eccentric portion 47.

For the purpose of adjusting the relative angularity of the shaft 10 with respect to the drive gear 11 there is employed, in accordance with the present invention, an internal gear 49. In meshing engagement with the internal gear 49 is a spur gear 51 which is rotatably supported on bearings 54 fixed as by a force fit on the eccentric portion 47 and retained from axial movement by projecting lip 45 and ring 41. As shown, the internal gear 49 is formed integral with the external driving gear 11 but it is to be understood, however, that the internal gear may be formed as a separate gear and attached for rotation with the external driving gear 11. The internal gear 49 is formed with a greater number of teeth than the spur gear 51 such that the relative angular position of meshing engagement of the teeth of the spur gear 51 and internal gear 49 may be altered upon changing the eccentricity of the eccentric portion 47 with respect to the shaft 10 as will be more fully explained below. This alteration of the angularity of the meshing engagement will hereinafter be referred to as the phase shift. In the embodiment illustrated, the internal gear has 100 teeth and the spur gear has 96 teeth which results in a difference of four teeth. The difference in the number of teeth may be varied depending upon various factors such as whether fine or coarse adjustment of registry is desired, the speed of the machine, etc.

The phase shift of the spur gear with respect to the internal gear is achieved by adjustments made angularly repositioning the eccentricity of the eccentric portion 47 of the sleeve 27 while the machine is running or stopped. To this end, there is provided a hand wheel 53 keyed to an adjusting shaft 55 which is turnably supported in a quill 57 which is journaled at one end in a gear guard plate 59. The other end of shaft 55 is turnably supported in a bushing 61 seated in the frame 19. Keyed to the adjusting shaft 55 is gear 63 which drives idler gear 65 rotatably journaled on a stud 67 fixed to the frame 19. The gear 65 meshes with a gear 69 which is concentrically fixed by way of bolts to the sleeve 27. Accordingly, upon turning of the hand wheel 53, the gear train 63, 65, and 69 is effective to turn the sleeve 27 which as previously described is turnably mounted relative to the shaft 10. This turning of the sleeve 27 also causes the angular positioning of the eccentricity of the eccentric portion 47 with respect to the shaft 10 to change and a corresponding phase shift of the spur gear 51 relative to the internal gear 49 occurs. It is apparent, therefore, that since the internal gear 49 is rotatable with the driving gear 11, there is a corresponding change in angularity between the spur gear 51 and the driving gear 11.

To adjust the angularity of the shaft relative to the driving gear by way of the spur gear, the latter is coupled to the shaft by the coupling mechanism generally designated as 73.

As shown, the coupling mechanism 73 comprises a pair of diametrically opposed pins 75 secured to the spur gear 51, which pins 75 carry a roller head 59 engaging within open-ended slots 77 formed in a disc 79 which is formed with a central opening 81 larger than the reduced end portion 15 of the shaft 10 so that in effect the disc 79 is floatingly mounted relative to the shaft 10. The floating disc 79 with the open-ended slots 77 formed therein serves to permit the changing of the eccentricity of the spur gear 49 and permits motion to be transmitted from the latter in a manner to be described.

In the floating disc 79 and preferably 90 degrees out of phase with the roller heads 59 are open-ended slots 85 which receive roller heads 86 rotatably mounted on roller pins 83 which are fixed in the vertical flange 87 of a hub 89. The hub 89 is keyed to the reduced portion 15 of the shaft 10 such that any motion transmitted from the driving means by way of the spur gear 51 through the floating disc 79 is accordingly transmitted to the drive shaft 10.

Hence, the shaft is driven from the gear P of the machine gear train by way of driving gear 11, internal gear 49, spur gear 51, floating disc 79 and hub 89. As discussed in detail heretofore, the phase shift of the spur gear and the driving gear is adjustable. It is clearly apparent, therefore, that such phase shift will also reflect itself by way of the floating disc 79 and hub 89 to the shaft 10. Accordingly, if during operation it is found that the shaft is not in registry with the other operating parts of the machine, that is, in the example herein employed, the printing roller is not registering properly with the sheet material to be printed, the angular positioning of the eccentricity of the eccentric 47 supporting the spur gear 51 may be altered by adjustment of the hand wheel as above explained. Such adjustment of the eccentric 47 results in a phase shift between the spur gear 51 and the driving gear 11 and a corresponding phase shift of the shaft 10 with respect to the driving gear 11. Hence, by turning the hand wheel clockwise or counterclockwise, the printing roller 13 may be advanced or retarded to achieve the desired registry. In the example above given in which the internal gear is provided with 100 teeth and the spur gear with 96 teeth, for each complete rotation of the hand wheel there results a phase shift of 4 teeth such that the angular relationship is altered 1/24 of a circle or approximately 15 degrees. It is obvious, of course, that intermediate turns will result in lesser degrees of phase shift and a corresponding change of angularity of the shaft 10 with respect to the driving gear 11.

When the desired registry is obtained, there is provided a locking mechanism for holding the adjusting shaft and thereby the relative angular positioning of the eccentricity is fixed. As shown, the locking means may comprise a split clamp 91 which is arranged to clamp the adjusting shaft 55 by tightening of the clamping screw 93.

For the purpose of visually indicating the degree of adjustment, that is the angularity of the drive shaft 10 relative to the driving gear 11, there is provided a direct ratio gear train operatively connected to the eccentric 47 such that upon turning thereof at any angle between 0 degrees and 360 degrees by way of the adjusting shaft 55, the indicator will show the precise rotational position of the shaft 10. To this end, a cluster gear 95 is provided on the idler gear 65. As described before, the idler gear 65 is a member of the gear train for turning and adjusting the angular positioning of the eccentricity of the eccentric 47 and meshes with the gear 69 for turning the eccentric 47. Hence, the degree of adjustment is also reflected in the cluster gear 95. The cluster gear 95 meshes with gear 97 keyed to one end of the rotatably supported quill 57 which carries on its other end a pinion gear 99 which meshes with idler gear 101 rotatably journaled on a stud 103 which may be mounted conveniently as shown on a flange of the split clamp 91. The idler gear 101 meshes with a gear 105 turnably mounted on the end bell 107 enclosing the end of the shaft 10. The gear 105 has fastened on its outer face a plate 109 having a graduated scale inscribed thereon. The scale may be graduated into any convenient units such as inches, degrees, or the like to indicate the relative position of the shaft 10 with respect to the driving means.

Under some circumstances, it may be necessary to axially adjust the shaft to achieve the desired longitudinal axial registry of the operating element mounted on the shaft 10. To this end, there is attached to the end of the shaft 10 an end disc 111 which is seated within a slightly enlarged opening of the hub 89 such that the outer edge of the disc 111 engages the vertical wall 113. Force fitted within the enlarged opening and on the outer periphery of an end plunger 115 is a thrust bearing 117 which is firmly held against axial movement between the end disc 111 and the wall of an annular shoulder 121 formed on the plunger 115. A second thrust bearing 117 similarly fixed to the plunger 115 and the hub 89 is located on the opposite side of the annular shoulder and is firmly held thereagainst by way of a keeper 123 fast to the end of the hub 89 by a screw 125 and laminated washer 127. The portion 129 of the plunger 115 extending beyond the keeper is threaded into an end plate 131 fixed on the bell 107. Secured as by keying to the end of the plunger 115 is a hand wheel 133.

From the foregoing, it is readily apparent that upon turning of the hand wheel 133, the plunger 115 is advanced or retracted axially a linear distance and is effective to move the hub 89 axially a corresponding longitudinal axial distance. Such longitudinal axial movement of the hub 89 causes the shaft 10 which is keyed thereto and abuts the disc 111 to move axially the same distance within the journaling bearings 17. As above described, the driving and registry means are also attached to the shaft 10 for endwise movement therewith. Hence, upon turning of the hand wheel 133, the shaft and the driving and registry devices are moved a corresponding endwise or axial distance. In this connection, it is to be observed that the gear P of the machine gear train and the gear 69 are constructed of sufficient width such that they remain in meshing engagement with their respective mating gears when endwise adjustment is made. When the desired endwise registry is achieved, the plunger 115 is fixed in position by tightening of the bolt 137 which serves to close the slit 135 provided in the end plate 131 and thereby clamp the threads against further movement.

It will be readily seen from the foregoing that the operative parts are so arranged so as to permit an adjustment of the shaft with respect to its driving means anywhere within a 360 degree rotation of the shaft. By way of electrical control equipment well known in the art, such adjustment may be automatically accomplished. Furthermore, the present invention provides for a simple endwise adjustment of the shaft so as to permit ready registry thereof.

What is claimed is:

1. In a machine including a rotating shaft for performing an operation on a moving web and including a driving means for said shaft, a means for altering the angular relationship of said shaft with respect to said driving means comprising, a sleeve freely journaled on said shaft for independent turning thereon, said sleeve including a portion coaxial with said shaft and a portion eccentric to said shaft, an internal gear rotatably mounted on said coaxial portion, a spur gear rotatably mounted on said eccentric portion in meshing engagement with said internal gear the central axes of said gears being substantially parallel, means connecting said spur gear with said operating shaft, and means for turning said sleeve relative to said shaft so as to adjust the angular position of the eccentricity of said eccentric about the axis of said shaft and thereby of the displacement of the central axis of said spur gear with respect to the central axis of said internal gear whereby said shaft is rotatably repositioned about its longitudinal axis with respect to said driving means.

2. The invention as defined in claim 1 in which the means for turning the sleeve comprises a gear fixed to said sleeve, an adjusting shaft mounted substantially parallel to the rotating shaft, gear means on said adjusting shaft engageable with said sleeve gear for turning said sleeve, and means for locking said adjusting shaft in a select position so as to fix said sleeve against turning and thereby maintain the angular position of said drive means with respect to said rotating shaft.

3. The invention as defined in claim 2 in which means are provided for indicating the angular position of the rotating shaft relative to the driving means, said indicating means including an end bell mounted coaxially about said rotating shaft, a gear mounted on said end bell for rotatable movement relative thereto, said gear having indicia along the periphery thereof and a direct ratio gear train operatively connecting the sleeve gear and said end bell gear whereby the angular position of said sleeve relative to said shaft is indicated on said end bell indicia means.

4. In a machine having a rotatable shaft for performing an operation on a moving web and including a drive gear for rotating said shaft, a sleeve freely journaled on said shaft for independent turning thereon, said sleeve having a portion coaxial with said shaft and a portion eccentric with respect to said shaft, an annular gear rotatably mounted on said coaxial portion of said sleeve, said annular gear having external and internal teeth and said external teeth meshing with said drive gear, a spur gear rotatably mounted on said eccentric portion and meshing with said internal teeth, a hub fixed to said shaft, a floating disc disposed between said spur gear and said hub, and means connecting said spur gear, floating disc, and hub whereby a direct driving relationship of said shaft by said spur gear is obtained, and means for turning said sleeve relative to said shaft for selectively adjusting the angular position of the eccentricity of said spur gear about the axis of said shaft so that the relative angular position of said shaft about its longitudinal axis with respect to said drive gear may be varied.

References Cited in the file of this patent
UNITED STATES PATENTS

| | | |
|---|---|---|
| 1,868,385 | Greenwood | July 19, 1932 |
| 2,030,028 | Greenwood | Feb. 4, 1936 |
| 2,372,783 | Jacobson | Apr. 3, 1945 |
| 2,385,918 | Heberlein | Oct. 2, 1945 |
| 2,412,243 | Behrens | Dec. 10, 1946 |
| 2,654,262 | Stewart | Oct. 6, 1953 |
| 2,677,971 | Greenwood | May 11, 1954 |
| 2,739,488 | Harrison | Mar. 27, 1956 |